July 7, 1964

G. D. HEDGES ETAL 3,139,854

MOVABLE TAPE INDICATING DEVICE

Filed June 28, 1962

2 Sheets-Sheet 1

INVENTORS.
GEORGE D. HEDGES
EARL R. STENSGAARD
BY

ATTORNEY.

United States Patent Office 3,139,854
Patented July 7, 1964

3,139,854
MOVABLE TAPE INDICATING DEVICE
George D. Hedges, East Oakdale Township, Washington County, Minn., and Earl R. Stensgaard, St. Joseph, Wis., assignors to Minneapolis-Honeywell Regulator Company, Minneapolis, Minn., a corporation of Delaware
Filed June 28, 1962, Ser. No. 205,906
12 Claims. (Cl. 116—135)

This invention relates to the field of indicating instruments and more particularly to electrically actuated linear instruments for use where panel space is at a premium and it is desirable to give a plurality of indications in the same area of observation. It has been found that indicators of the type having a linear scale and an index, one movable relative to the other, are more quickly and accurately read than the older type comprising a needle movable with respect to an arcuate scale. For this purpose it is known to impress suitable graduations on a tape movable linearly with respect to a fixed index, and fasten the ends of the tape to suitable feed and take-up drums, so that when a driving motor is energized tape passes from one drum to the other until the appropriate graduation on the tape comes into alignment with the fixed index. It is also known to move an index linearly with respect to a fixed scale, although here the total amount of travel is limited by the length of the instrument.

The present invention has for its object to provide an improvement on movable tape instruments which obviates the need of a take-up drum for the indicator tape by arranging for a single drum to perform both feed and take-up functions, and which is capable of use in the same panel space as, and simultaneously with, another instrument of the linear type.

It is an other object of the invention to provide an improved indicator in which the indication is given by the position of the free end of a tape which is movable in opposite directions linearly by rotation in opposite directions of a drum to which the other end of the tape is fastened.

Various other objects, advantages, and features of novelty not individually numerated above which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

Figure 1:
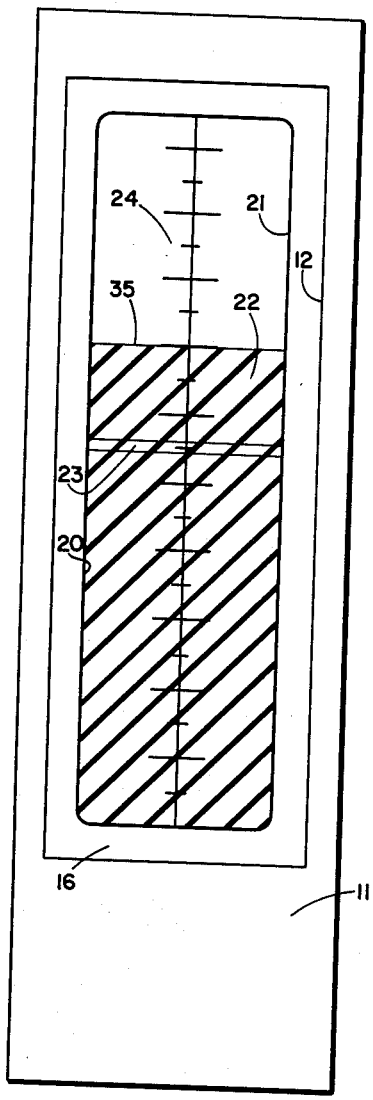
Figure 2:
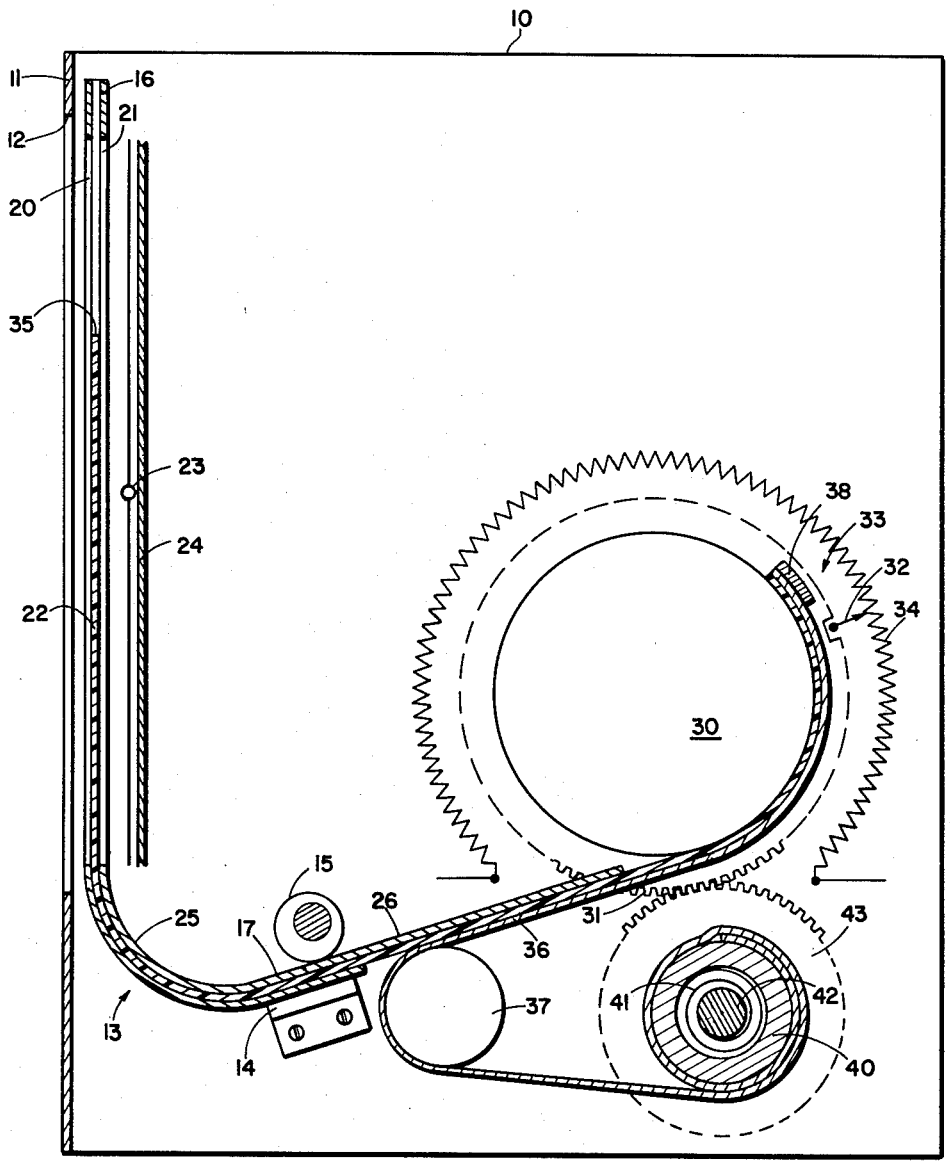

In the drawing, FIGURE 1 is a front view of an instrument embodying the invention, and FIGURE 2 is a schematic, partially sectional view of the mechanism seen from the side.

As shown in the drawing, the instrument is contained in a housing 10, behind a panel 11 having a cutout or transparent window 12. A tape guide or chute 13 is mounted behind the window 12 by being clamped between a bracket 14 and an eccentric roller 15, or by other suitable mounting means. Guide 13 has a generally L shaped configuration, and is tubular in section: it comprises a vertically extended portion 16 and a rearwardly extending portion 17. The front and rear walls of the guide 13 are cut away at 20, 21 to make visible a tape 22, an index 23, and a scale 24, relative movement between members 23 and 24 taking place as is well known in the art. Portions 16 and 17 of guide 13 are joined by a smooth curve 25, and the upper wall of portion 17 is extended as a tongue 26.

Tape 22 is made of firm, elastic material which is at least partly transparent throughout. It may be uniformly colored, but in the drawing is shown as a colorless transparent strip carrying opaque cross-hatching, so that index 23 and scale 24 may be viewed through the transparent portions between the diagonal cross-lines.

The lower side of tongue 26 is shown as lying in a surface which is tangent to the periphery of a feed drum 30, mounted for reversible rotation by suitable servomotor means. A motor particularly adapted for use in this connection is disclosed in Hedges Patent 3,098,400.

Drum 30 includes a drive gear 31, and is shown schematically as carrying the slider 32 of a voltage divider 33 whose winding is shown at 34. Members 32–34 and the associated motor are parts of a servosystem by means of which the position of tape 22 is made representative of a variable to be indicated. It is to be particularly noted that one end 35 of tape 22 is entirely free, and it is the position of this end of the tape which is read against index 23 or scale 24, as the case may be, to give the indication of the instrument.

The other end of tape 22 passes around drum 30 and is fastened thereto by suitable means 38, together with one end of a flexible band 36 which overlies the tape. Band 36 passes over an idler drum 37 and then around a take-up drum 40, to which its other end is fastened. Drum 40 is connected through a spring schematically shown at 41 to a hub 42 which carries a gear 43 meshing with gear 31. The arrangement is such that tape 36 is at all times maintained in tension, any change in take-up rate resulting from increased diameter as more of band 36 is wound onto drum 40 being taken care of by the action of spring 41. The spacing between the periphery of drum 37 and tongue 26 is substantially equal to the combined thickness of tape 22 and band 36.

The structure described above makes it possible to cause linear motion of tape 22 in both directions by rotation of drum 30. Counterclockwise rotation of drum 30 would move tape 22 downwardly in guide 13 without any difficulty, but without the provision of members 36 to 43 inclusive, rotation of drum 30 in a clockwise direction might do no more than spring tape 22 away from the drum, or simply buckle it. It will be appreciated that if desired tongue 26 may be eliminated and a second band similar to band 36 but on the other side of tape 22 may be provided with a second idler and spring drum instead.

From the foregoing it will be apparent that an indicator has been invented comprising a tape having a free end which is driven longitudinally in either direction along a guide by reversible rotation of a drum around which the other end of the tape is passed and to which it is fastened, suitable means being provided for preventing buckling of the tape when it is being discharged from the drum.

Numerous objects and advantages of our invention have been set forth in the foregoing description, together with details of the structure and function of the invention, and the novel features thereof are pointed out in the appended claims. The disclosure, however, is illustrative only, and we may make changes in detail, especially in matters of shape, size, and arrangement of parts, within the principle of the invention, to the full extent indicated by the broad general meaning of the terms in which the appended claims are expressed.

What is claimed is:

1. In combination: a feed drum; a tape guide spaced from said drum; an elongated tape of firm, elastic material, the first end of said tape being free and being received in said guide for longitudinal movement, and the second end of said tape being passed around said feed drum and being fastened thereto; and means for preventing buckling of said tape as it is discharged from said drum, including at least one flexible band, means fastening one end of said band to said drum in overlying relation to the portion of said tape which is wound on said drum, to prevent radial movement of said tape with respect to said drum, and means maintaining said band in tension as said drum is rotated, whereby rotation of said feed drum in opposite directions is adapted to cause linear movement of said tape in opposite directions in said guide.

2. Apparatus according to claim 1 including a take-up drum for said band and means driving said take-up drum from said feed drum.

3. Apparatus according to claim 1 including an idler drum for said band located adjacent said tape guide.

4. Apparatus according to claim 1 in which said tape guide includes a projecting tongue, together with an idler drum located adjacent said tape guide and spaced from said tongue by substantially the combined thickness of said tape and said band.

5. Apparatus according to claim 1 including a take-up drum, means driving said take-up drum from said feed drum, and means resiliently fastening to said take-up drum the end of said band which is not fastened to said feed drum.

6. Apparatus according to claim 1 in which said tape guide includes a projecting tongue lying in a surface substantially tangent to said feed drum.

7. Apparatus according to claim 1 in which said tape guide comprises an elongated chute having internal cross sectional dimensions which are substantially the same as the cross sectional dimensions of the tape, and means associated with said chute for facilitating observation of the opposition of said tape in said chute.

8. Apparatus according to claim 1 in which said tape guide is nonlinear, and includes a portion lying in a surface tangent to said feed drum.

9. In combination: a feed drum; an elongated chute including a tongue lying in a surface tangent to said drum; an elongated tape of firm, elastic material, the first end of said tape being contained in and guided by said chute, and the second end of said tape passing around said feed drum; a take-up drum; a band of flexible material; means fastening the first end of said band and said second end of said tape to the periphery of said feed drum with said band overlying said tape; means connecting the second end of said band to said take-up drum; an idler drum located between said feed drum and said chute, in a position to maintain contact between said tape and said band substantially until said tape enters said chute; means for causing rotation of said feed drum whereby to cause movement of said tape longitudinally of said chute; and resilient means driving said take-up drum from said feed drum so that as said feed drum is rotated said band is transferred between said feed drum and said take-up drum.

10. In combination: a feeder drum; a plurality of elongated laminar members fastened at one end to said drum in overlapping relation; a take-up drum driven by said feed drum; means connecting to said take-up drum the end of the outermost laminar member which is not fastened to said feed drum; and a guide member freely receiving the end of the next outermost laminar member which is not fastened to said feed drum, whereby upon rotation of said feed drum said outermost laminar member moves longitudinally with respect to said guide member.

11. In combination: a feed drum; a plurality of elongated laminar members fastened at first ends to said drum; a guide member freely receiving the end of one laminar member which is not fastened to the drum; and means maintaining another laminar member in tension regardless of rotation of said drum, whereby said rotation produces linear motion of said one laminar member in said guide member.

12. In combination: a feed drum; a tape guide spaced from said drum; an elongated tape of firm, elastic material, the first end of said tape being free and being received for longitudinal movement in said guide, and the second end of said tape being passed around said drum and being fastened thereto; means for causing reversible rotation of said drum to thereby cause linear movement of said tape in opposite directions in said guide, and means extending from said drum and movable with said tape for preventing buckling thereof as it is fed from said drum.

References Cited in the file of this patent

UNITED STATES PATENTS

| 1,558,920 | Rech | Oct. 27, 1925 |
| 1,665,891 | Nystrom | Apr. 10, 1928 |
| 2,118,675 | Jackson | May 24, 1938 |
| 2,299,284 | Steedemann | Oct. 20, 1942 |
| 2,804,041 | Neugass | Aug. 27, 1957 |
| 3,040,700 | Smith | June 26, 1962 |
| 3,083,487 | Hagood | Apr. 2, 1963 |

FOREIGN PATENTS

| 451,146 | Great Britain | July 30, 1936 |
| 1,240,798 | France | Aug. 1, 1960 |